W. F. CREMEAN.
THIRD POINT SUPPORT FOR BRAKE BEAMS.
APPLICATION FILED MAR. 20, 1919.
1,309,187.
Patented July 8, 1919.
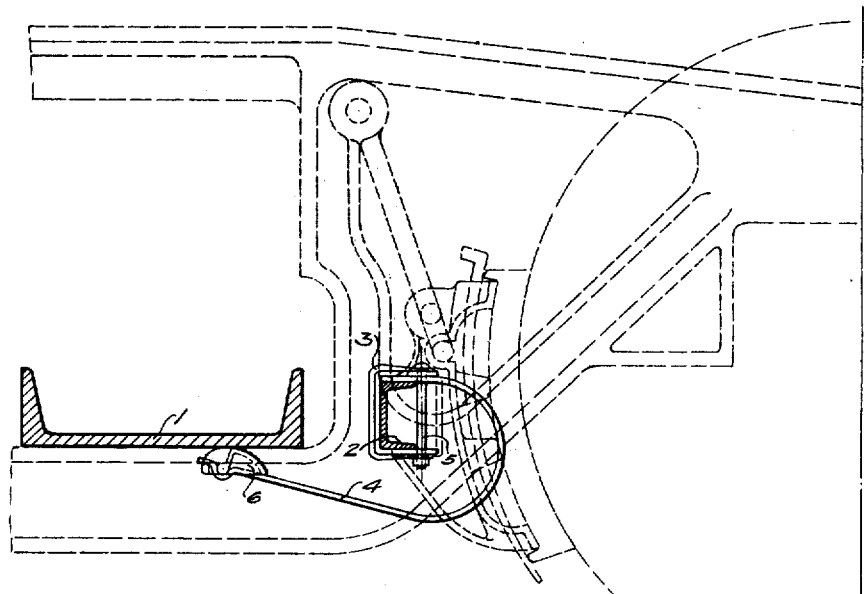
Fig-1
Fig-4
Fig-2
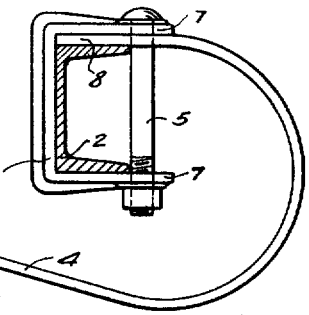
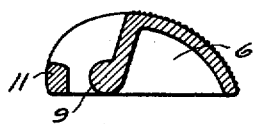
Fig-5
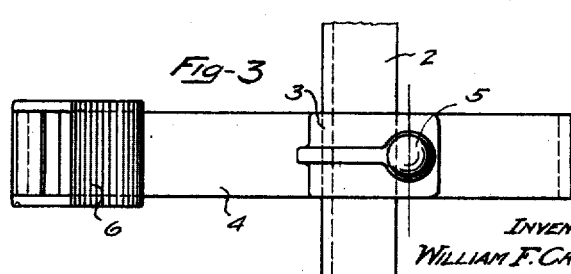
Fig-3
INVENTOR
WILLIAM F. CREMEAN
By W.E.Illing
Atty

UNITED STATES PATENT OFFICE.

WILLIAM F. CREMEAN, OF WILKES-BARRE, PENNSYLVANIA.

THIRD-POINT SUPPORT FOR BRAKE-BEAMS.

1,309,187.  Specification of Letters Patent.  Patented July 8, 1919.

Application filed March 20, 1919. Serial No. 283,885.

*To all whom it may concern:*

Be it known that I, WILLIAM F. CREMEAN, a citizen of the United States, residing at Wilkes-Barre, Pennsylvania, have invented certain new and useful Improvements in Third-Point Supports for Brake-Beams, of which the following is a specification, reference being had to the accompanying drawing, forming a part thereof.

My invention relates to new and useful improvements in means for holding and maintaining the brake shoes in proper relation with the wheels of a railway car, and has for its object to provide a counter balance for the brake beam. With these and other objects hereinafter explained in view, my invention consists in the construction and combination of elements herein described and claimed.

In the accompanying drawing, which illustrates the preferred embodiment of my invention; Figure 1 shows the invention as applied to the brake beam and its coöperation with a portion of the truck frame. Fig. 2 is a full side view of the device as applied to the brake beam; Fig. 3 is a plan view of the device as shown in Fig. 2; Fig. 4 is a plan view of the cam member, which coöperates with a portion of the truck frame; Fig. 5 is a section on line 5—5 of Fig. 4.

Similar characters designate similar parts throughout the several figures of the drawing.

Referring now to the parts by number: 1 represents the part of a truck known as the spring plank, which, in this instance, is shown in the form of a channel. To the brake beam 2, which is supported from the truck frame in the usual manner, is attached the device of this invention, which comprises a bracket 3, a spring member 4, a bolt 5 and a cam member 6.

By referring to Fig. 1 it will be observed that the brake shoe and brake head extend considerably to the right of the brake beam, thereby creating an over turning or rotating tendency of the beam in a clock wise direction.

By attaching the spring member 4 to the brake beam and allowing it to extend underneath the spring plank, as shown in Fig. 1, the rotating tendency of the brake beam is counteracted. The bracket for attaching the spring member 4 to the brake beam 2 is provided with two laterally extending arms 7, which embrace the brake beam 2 and the end 8 of the spring member 4.

The cam member 6 functions both as a bearing and as a means for creating a slightly counter clock wise rotation of the brake beam to offset any tendency of the brake beam to rotate clock wise, due to wear in the various parts of the truck and supporting means for the brake beam.

The cam member 6 is provided with a journal portion 9, which is socketed in a bearing portion 10 and supported by the spring member 4. The cam member 6 is also provided with a stop portion 11, which engages the end portions 10 and 12 of the spring member 4, and thereby holds the journal portion 9 in engagement with the socket in the end of the spring member 4.

The cam member 6 is also provided with a series of ribs on the top surface to increase the friction against the spring plank 1, thereby assisting rotation of this member during application or release of brakes.

It will be understood from this description that although the improvements in this invention are very simple, they accomplish in a thoroughly practical manner all the objects sought.

I wish it further understood that I do not desire to be limited to the specific construction or arrangement of elements shown and described, as it is obvious that changes in construction and arrangement may be made without departing from the spirit of the invention.

Having thus described my invention, I aim in the appended claims to cover all modifications which do not involve a departure from its spirit and scope.

What I claim as new and desire to secure by Letters Patent of the United States is:

1. In a car truck, the combination with a truck member and a brake beam of a balance member secured to said brake beam and having an end disposed beneath said truck member and slidably coöperating therewith.

2. In a car truck, the combination with a truck member and a brake beam of a balance member secured to said brake beam and having a reciprocating bearing on said truck member.

3. In a car truck, the combination with a frame member and a brake beam of a balance member secured to said brake beam and having an end disposed beneath said frame member for reciprocating contact therewith.

4. In a car truck, the combination with a frame member and a brake beam of a balance means comprising a spring member secured to said brake beam and a cam member engaging a socket in said spring member and resting on said frame member.

5. In a car truck, the combination with a frame member and a brake beam of a balance means comprising a spring member, a bracket surrounding a portion of said brake beam and a portion of said spring member and a cam member detachably mounted in a bearing in said spring member and bearing on the under side of said frame member.

6. In a car truck, the combination with a frame member and a brake beam of a balance means comprising a spring member secured to said brake beam and a rocking member provided with a journal portion and a bearing surface eccentric to said journal.

7. In a car truck, the combination with a frame member and a brake beam of a balance means comprising a spring member secured to said brake beam and a rocking member journaled in a bearing in said spring member, said rocking member being provided with a corrugated bearing surface for contact with said frame member.

This specification signed and witnessed this 25th day of Feb. 1919.

WILLIAM F. CREMEAN.

In the presence of—
W. E. WINE,
EDWARD M. TENNEY.

Copies of this patent may be obtained for five cents each, by addressing the "Commissioner of Patents, Washington, D. C."